United States Patent [19]

Schwarz

[11] 4,268,333
[45] May 19, 1981

[54] PROCESS OF MAKING HIGHLY ADHESIVE PLASTIC TOP COATINGS ON METALLIC SUBSTRATES

[76] Inventor: Hans G. Schwarz, Weimarerstrasse 8, 6940 Weinheim-Waid, Fed. Rep. of Germany

[21] Appl. No.: 969,941

[22] Filed: Dec. 15, 1978

[30] Foreign Application Priority Data

Aug. 12, 1978 [DE] Fed. Rep. of Germany ....... 2835401

[51] Int. Cl.³ .................... B32B 81/00; B29C 25/00; B29C 19/00; B31C 39/00
[52] U.S. Cl. ...................................... 156/161; 156/82; 156/165; 156/143; 156/155
[58] Field of Search ..................... 156/244.11, 48, 293, 156/300, 311, 161, 149, 160, 165, 144, 143, 82, 155; 427/118, 258, 358

[56] References Cited

U.S. PATENT DOCUMENTS 3,843,435 10/1974 Strom .................................. 156/143

FOREIGN PATENT DOCUMENTS 222721 8/1962 Austria ................................. 156/48
992282 6/1976 Canada .

Primary Examiner—John T. Goolkasian
Assistant Examiner—Louis Falasco
Attorney, Agent, or Firm—Staas & Halsey

[57] ABSTRACT

A process and apparatus for making highly adhesive plastic top coatings, more particularly of polyurethane or thermoplastic polyester, on metallic substrates, particularly of braided or plaited wire layers, as pressure substrate, having an inner core of plastic, particularly a polymer of thermoplastic plastic, surrounded by the substrate, the plastic top coating being extruded in an extruder head onto the substrate, characterized in that the substrate having openings is prestressed then heated to approximately the temperature of the extrudate or the extruder head, so that there is generated in the inner core a radially directed prestress which forces at least part of the material thereof, while softening, through the openings in the substrate, and that thereafter a vacuum is created around the substrate or between the head and the flexible tube and that simultaneously with, or immediately after, the creation of the vacuum the top coating fusing intimately and/or bonding together with the material of the inner core that passes through the openings in the substrate.

9 Claims, 4 Drawing Figures

PROCESS OF MAKING HIGHLY ADHESIVE PLASTIC TOP COATINGS ON METALLIC SUBSTRATES

BACKGROUND AND SUMMARY OF INVENTION

The invention relates to a process of making highly adhesive coatings of plastic, more particularly polyurethane or a thermoplastic polyester, on metallic substrates, more particularly of braided or plaited wire layers, as pressure substrates having an inner core from plastic (particularly a polymer or a thermoplastic plastic) surrounded by said substrate, the plastic top coating being extruded in an extruder head onto the substrate. The invention is further concerned with a device for carrying out said process.

To provide metallic tubes consisting, for example, of braided, woven or plaited wire layers with plastic (e.g. polyurethane) coatings is a technique well known in the art. A widely used process is the extrusion process, in which high-polymer materials are rendered viscous at elevated temperatures under heat, then allowing them to be deformed into coatings and profiles. This is common practice, especially in the manufacture of flexible tubes of plastic with pressure substrates.

It is also common knowledge that polyaddition products from diisocyanides and polyols, known as polyurethanes, are quite resistant to abrasion, cold, and oxygen, and are particularly well suited to work pieces that are subject to these deteriorative agents. Especially in the manufacture of pressure hoses in which a core from polymers or thermoplastics is provided and the pressure substrates of which are metal wires, there are generally employed—with the subsequent operating conditions in mind—materials that are remarkable for their resistance to abrasion and tear and for their percentage elongation, and which practically do not show signs of aging even when exposed to oxygen. Despite the numerous advantages offered by flexible plastic tubes, there are drawbacks that have heretofore confined the range of applications in some fields, particularly their great rigidity, which causes oversensitivity to buckling. To rectify or reduce these deficiencies to a minimum, special methods must be devised, besides using special materials such as adhesives. A decisive factor for the attainment of optimum flexibility is a strong bonding between inner core and pressure substrates, between the pressure substrates themselves or between pressure substrates and top coating. One such method is known as the "sheathing process under compressive conditions."

West German Patent No. 2 026 814 recites such sheathing process under compressive conditions for the purpose of producing highly adhesive polyurethane coatings on metallic substrates, more particularly on wires, flexible tubes, and pipes, through extrusion. In this process, an adhesive material for the polyurethane coating is spread upon the metallic substrate and the metallic substrate thus treated is heated in a manner known per se prior to entry in an extruder head to a temperature corresponding to the working temperature of the extruder head. Preferably, the metallic substrate is a helicoidal steel wire sheath.

Moreover, the printed publication of German Unexamined Patent Specification No. 23 42 133, publication date of Mar. 7, 1974, makes known a flexible thermoplastic tube having an outer braided or plaited reinforcement, usually in the form of metal wires. The thermoplastic tube is softened and expanded outwardly so that, following the inner surface contour of the reinforcement, it is forced with the outer surface of the tube into the reinforcement netting and forms therewith a firm bond throughout the length of the reinforcement. The tube is now solidified or allowed to set in this state. Thus, this tube has a top coating created by the material of the thermoplastic tube that has passed through the outer reinforcement.

To make this pressure tube, it is also common practice, as exemplified by the printed publication of this German Unexamined Patent Specification No. 2 342 133, to heat the tube and the reinforcement to a temperature above 60° in order to soften at least the outer surface of the tube and to bring about a positive differential pressure between the inner and outer surfaces of the tube so as to cause such an expansion that its outer surface is deformed and follows the inner contour of the reinforcement. The tube is then cooled while the differential pressure is held constant, which results in a permanent solidification or setting of the tube in the deformed state. The inner surface of the tube may also be subject to pressure. The tube provided with the reinforcement and subject to pressure is moved continuously through a furnace at a temperature and for a period sufficiently long to soften or to join by fusion at least the outer surface portions of the thermoplastic tube.

The process described in this unexamined patent specification and the resultant pressure tube are handicapped by drawbacks, which confine the use of such pressure tubes.

The openings in the outer reinforcement or in the metal pressure substrate must be relatively large to allow a sufficient amount of thermoplastic material to pass through. This again limits the serviceability of this type of pressure tube for high-pressure applications. Moreover, the material of the inner thermoplastic tube passing through the openings is distributed highly unevenly, so that the resultant top coating is not uniform in strength, density and contour. However, the most serious drawback lies in the fact that inner core and top coating can only be made of one and the same material. Thus, with this known process it is impossible to make flexible pressure tubes with a variety of materials for inner core and top coating; this limits their range of applications.

Therefore, it is the primary object of this invention to streamline the type of process referred to at the start of this application in such a way that it can be used to make pressure tubes or pressure hoses from a variety of materials for the inner core and the top coating along the principles of the sheathing process under compressive conditions, a strong bond being formed between inner core and top coating, with both the inner core and the top coating adhering firmly to the substrate, and on the other hand fastening the top coating to the inner core by fusion.

According to the invention, this object is achieved in that the metallic substrate having openings is prestressed, then heated to approximately the temperature of the extrudate or of the extruder head, thereby creating in the inner core a radially directed prestress which forces at least part of the inner core material, while softening, through the openings in the substrate, then providing a vacuum around the substrate or between the torpedo and the flexible tube and simultaneously with, or immediately after, the creation of the vacuum, spreading the top coating upon the substrate, whereby the material of the top coating fuses intimately or/and bonds with the material of the inner core being forced through the openings in the substrate. The inner core and substrate may also be stressed simultaneously.

In a further development of the process according to the invention, prior to heating the substrate an adhesive material, particularly a polyurethane adhesive, may be spread thereupon. Moreover, the substrate may be treated with a solvent prior to the heating thereof.

In another highly advantageous development of the invention, the substrate may be heated by means of flame rings to oxidize the drawing lubricants on the substrate. Preferably, a flexible metal tube may be employed as a pressure carrier in the process according to the invention, which is made up of braided, woven or plaited layers and forms spaces or openings between the inner and outer surfaces of the substrate. The spaces or openings may, for example, have a cuboidal or rhomboid configuration.

In contrast to comparable processes well known in the art, the process according to the invention has a number of outstanding advantages. Thus, according to the process provided by the invention, it is possible to make a flexible pressure tube from a variety of plastic materials for the inner core and the top coating, which form a firm bond across the metallic substrate. This intimate union materially enhances the properties of this type of flexible pressure tubes with respect to their resistance to buckling, flexibility, and compressive strength. Especially the compressive strength can be increased, since a substrate with narrow openings can be utilized as a metallic base, e.g. a substrate made up of narrowly braided or woven wire layers. Advantageously, prestressing of the substrate, or also of the substrate together with the inner core, can prevent or reduce undesirable vibrations and, particularly, tension variations within the substrate.

Advantageously, the creation of a vacuum results in the extraction of residual moisture of any remaining solvent and the air trapped in the winding layers of the substrate prior to passage through the extruder head.

The advantage of the invention is seen in the fact that in order to attain better adhesion between inner core, pressure substrate, and top coating, the steel wire layers immediately in front of the extruder head are heated or flame-treated by means of one or more flame rings, whereby the temperature corresponds to that of the extruder head. This flame treatment oxidizes the drawing lubricants remaining on the metal wires and has a deleterious effect on the desired firmness of bonding between top coating and inner core. In addition, during the flame treatment the inner core, expanding outwardly owing to the pretension in radial direction, relaxes toward the pressure substrate or carrier, whereby part of the inner tube or at least the surface thereof softens and is forced through the gaps or openings of the metallic substrate. In this way, the material of the inner core is bonded intimately with that of the top coating which is simultaneously being extruded, thus forming an intimate union by fusion.

To carry out the process of the invention, a device is employed comprising an unwinding station followed in succession by: a brake or a synchronizing means, as the case may be, a heating unit, e.g. a flame-treating station comprising at least one flame ring, a vacuum station with a vacuum pump, an extruder with an extruder head, and a take-off mechanism for the finished flexible pressure tube. Furthermore, said pieces of equipment may be arranged in linear succession on a common base plate.

The invention provides a process by which flexible pressure tubes or pressure hoses can be made with a metallic substrate and a variety of materials for the inner core and of the top coating, whereby the material of the inner core and that of the top coating can firmly be fused or bonded together over the entire outer surface of the metal substrate, resulting in an outstanding union between inner core, pressure substrate, and top coating. This type of flexible pressure tubes are remarkable for their high buckling strength, flexibility, and resistance to pressure.

The objects, features, and advantages of the process of this invention will become readily apparent when taken in conjunction with the appended claims and the attached drawing wherein:

DESCRIPTION OF THE PREFERRED EMBODIMENT

Figure 1:
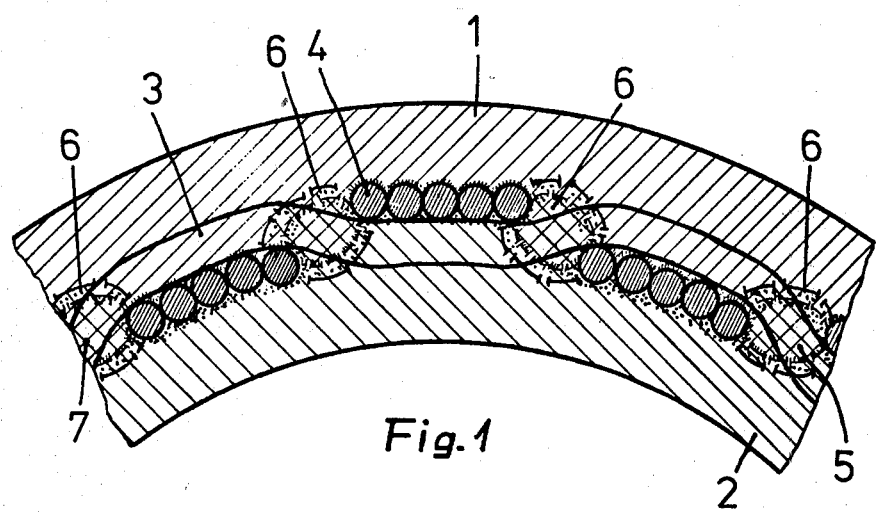
FIG. 1 is a cross-sectional area of a flexible pressure tube provided by the invention.
Figure 2:
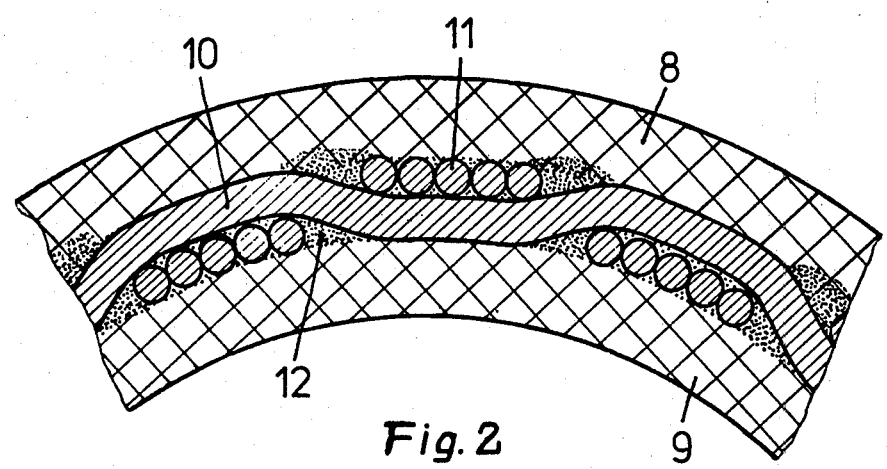
FIG. 2 is a cross-sectional area of another flexible pressure tube according to the invention.

FIGS. 1 and 2 show, the flexible pressure tubes embodying the principles of the invention. The flexible pressure tube of FIG. 1 comprises a top coating 1, preferably made from polyurethane or thermoplastic polyesters. A metallic substrate 4, here composed of single wires arranged in layers, is employed as a pressure carrier or substrate of the flexible pressure tube. The alternating position of the wire layers or wire bands is denoted by the reference numeral 3. Inner core 2 of the flexible pressure tube preferably consists of a polymer or thermoplastic material.

Figure 3:
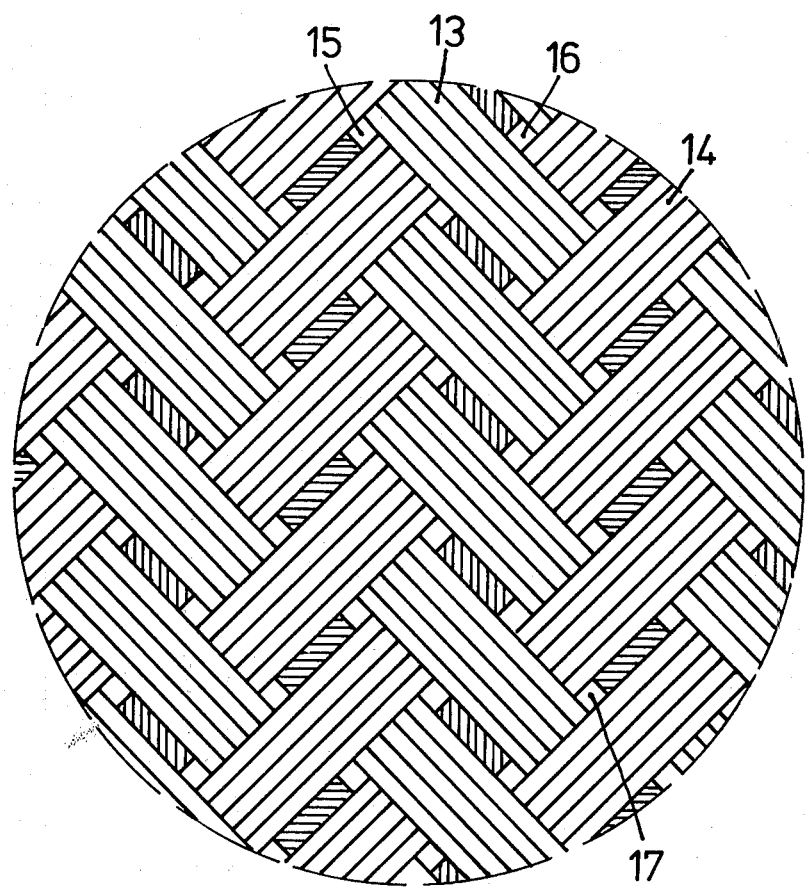
FIG. 3 is a top view of a section through a metallic substrate, with the top coating removed.

The single layers of wires 13, 14 of a metallic substrate are, for example, shown in FIG. 3. Said metallic substrate consists of interbraided or interwoven layers of wires 13, 14 that are interconnected, so that small regular rhomboid openings 15, 16, 17 are formed within the entire surface of the substrate. Said openings 15, 16, 17 are essential for carrying out the process of the invention, because upon softening of the inner core 2 the material thereof enters into the area of openings 5, 6, 7 of this type (FIG. 1) across the metallic substrate and forms with the material of the top coating spread thereupon from outside a firm bond shown in FIG. 1 by the double hatching of areas 5, 6 and 7.

FIG. 2 likewise shows a cross-sectional area of a flexible pressure tube made in accordance with the process of the invention. This flexible pressure tube comprises a top coating 8 and an inner core 9, between which there is again arranged a preferably metallic substrate made up of braided, woven or plaited layers of wire. The position of the wire braid is again denoted by the reference numeral 10. Here, too, the single wires of the metallic substrate form openings which, for example, may be arranged thereon in a specific pattern. In these areas, which in FIG. 2 are denoted by the reference numeral 12, the material of the inner core 9 pass, upon softening and under preliminary tension, through the openings of the substrate 11 and is firmly bonded together on the outer surface of the substrate with the material of the top coating 9. This is shown by the dotted areas in FIG. 2.

Figure 4:
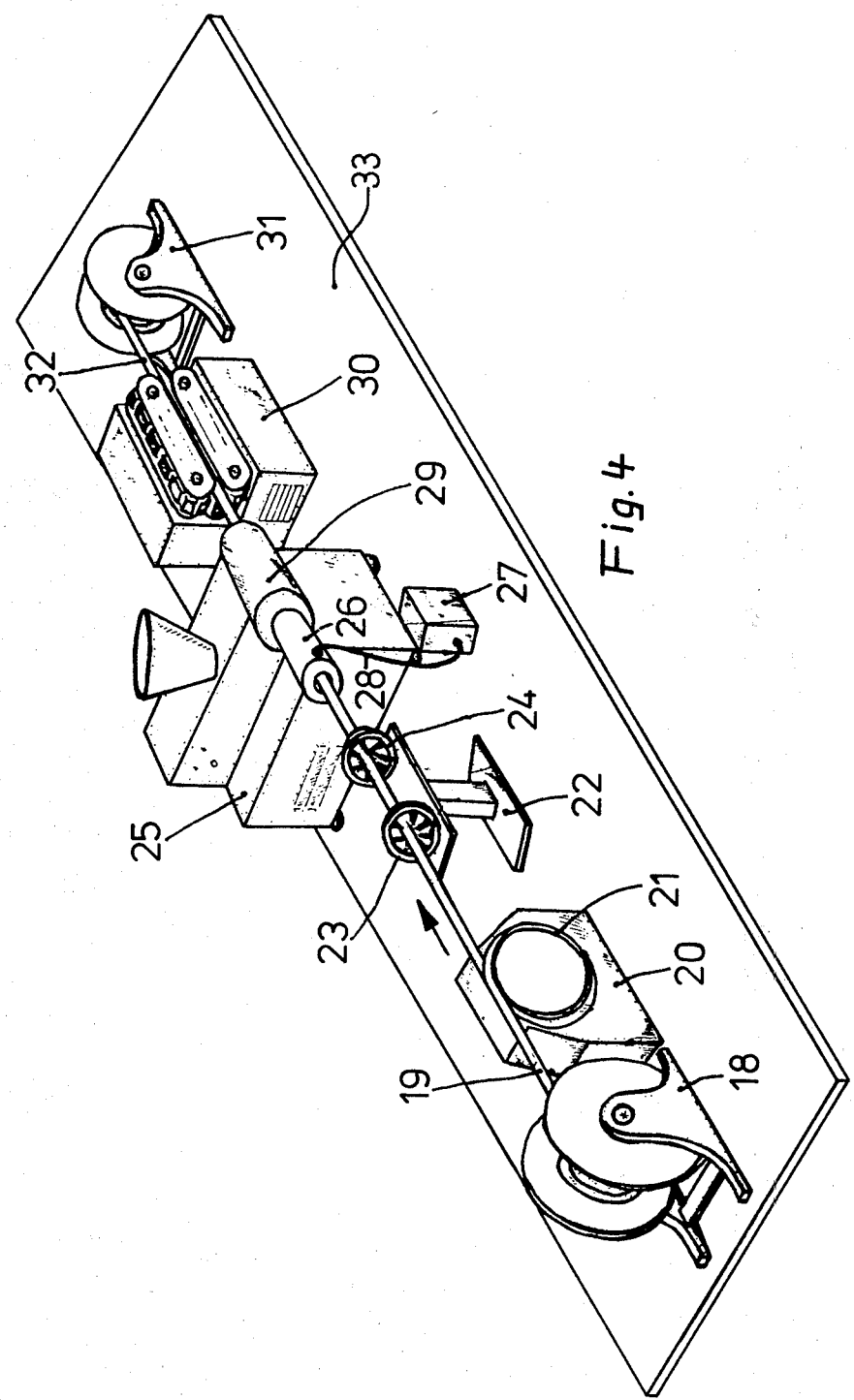
FIG. 4 is a perspective view of a device for carrying out the process of the invention.

FIG. 4 shows a means for carrying out the best mode of the process of the invention. The metallic substrate, which preferably is already mounted on an inner core, is wound up on a drum 18, from which the substrate 19 is drawn away by means of a take-off and synchronizing mechanism 20 which, for example, has a brake-disk around which the substrate 19 is wound to form a loop 21. By means of this braking device the take-off tension or take-away speed of the substrate 19 can be properly controlled. Particularly, a pretension is applied to the substrate 19 as a result of the braking or deceleration. This take-off and synchronizing mechanism 20 is followed by a flame-treating station 22 which preferably comprises two flame rings 23, 24, through the center of which the substrate 19 passes together with the inner core. Flame-treating station 22 is followed by a vacuum station 26, which is preferably constituted by a vacuum tube, to which a vacuum pump 27 is connected via a hose 28. As mentioned previously, the creation of the vacuum results in the extraction of residual moisture of any remaining solvent and the air trapped in the winding layers of the substrate prior to passage through the extruder head. Vacuum station 26 is followed by an extruder station 25 having an extruder head 29 which spreads the top coating upon the substrate 19. Extruder station 25 is followed by a take-off station 20, which causes the finished flexible pressure tube to be transported by drawing the substrate through the various stations. The take-off station 30 is followed by a winding device 31 for winding up the finished flexible pressure tube 32.

Preferably, all the pieces of equipment mentioned above are arranged in linear succession, in the direction of drawing, on a common base plate denoted by the reference numeral 33 (FIG. 4).

In further embodiments of the invention, the heating unit may also consist of an induction, an infrared, or a hot-air heater.

I claim:

1. A process of making highly adhesive plastic top coatings of polyurethane on metallic substrates of braided wire layers having openings as a pressure substrate, having an inner core of thermoplastic plastic, surrounded by said substrate, characterized in that said substrate having openings is prestressed mechanically by a braking device and then heated to approximately the temperature of the extrudate of an extruder head so that there is generated in the inner core a radially directed prestress which forces at least part of the material thereof, while softening, through the openings in said substrate, thereafter creating a vacuum around said substrate, extruding said plastic top coating onto said substrate from the extruder head, so that simultaneously with, or immediately after, the creation of said vacuum said top coating fuses intimately with and bonds together with the material of said inner core that passes through said openings in said substrate.

2. The process according to claim 1, characterized in that said inner core is prestressed by said braking device simultaneously with said substrate.

3. The process according to claims 1 or 2, characterized in that prior to heating said substrate there is applied thereto an adhesive material, more particularly a polyurethane adhesive.

4. The process according to claim 3 characterized in that prior to heating, said substrate is treated with a solvent.

5. The process according to claim 4, characterized in that the heating of said substrate is effected by means of flame rings and that the drawing solvents on said substrate are oxidized.

6. The process according to claim 5 characterized in that there is employed as a pressure substrate a flexible metal tube consisting of braided, woven or plaited layers forming spaces or openings between the inner and outer surfaces of said substrate.

7. The process according to claim 6 characterized in that said spaces or openings have a cuboidal configuration.

8. The process according to claim 7 characterized in that said spaces or openings have a rhomboid configuration.

9. A process of making highly adhesive plastic top coatings, on metallic substrates of plaited wire layers having openings as a pressure substrate, having an inner core of thermoplastic plastic, surrounded by said substrate, characterized in that said substrate having openings is mechanically prestressed and then heated to approximately the temperature of the extrudate of an extruder head, so that there is generated in the inner core a radially directed prestress which forces at least part of the material thereof, while softening, through the openings in said substrate, and that thereafter a vacuum is created around the substrate for extraction of residual moisture, extruding said plastic top coating onto said substrate from the extruder head so that the creation of said vacuum effects said top coating fusing intimately with and bonding together with the material of said inner core that passes through said openings in said substrate.

* * * * *